United States Patent
Zenk

(10) Patent No.: US 11,404,038 B2
(45) Date of Patent: Aug. 2, 2022

(54) PRIVACY SLEEVE FOR SMART SPEAKERS

(71) Applicant: Ronald J. Zenk, Excelsior, MN (US)

(72) Inventor: Ronald J. Zenk, Excelsior, MN (US)

( * ) Notice: Subject to any disclaimer, the term of this patent is extended or adjusted under 35 U.S.C. 154(b) by 770 days.

(21) Appl. No.: 16/393,201

(22) Filed: Apr. 24, 2019

(65) Prior Publication Data
US 2019/0333493 A1   Oct. 31, 2019

Related U.S. Application Data

(60) Provisional application No. 62/662,929, filed on Apr. 26, 2018.

(51) Int. Cl.
| | |
|---|---|
| *H04R 3/02* | (2006.01) |
| *G10K 11/175* | (2006.01) |
| *G10L 15/22* | (2006.01) |
| *H04R 1/40* | (2006.01) |
| *G10L 21/0208* | (2013.01) |
| *H03G 3/20* | (2006.01) |

(52) U.S. Cl.
CPC ............ *G10K 11/175* (2013.01); *G10L 15/22* (2013.01); *G10L 21/0208* (2013.01); *H04R 1/406* (2013.01); *G10K 2210/108* (2013.01); *G10L 2015/223* (2013.01)

(58) Field of Classification Search
CPC ............ G10K 11/175; G10K 2210/108; G10L 15/22; G10L 21/0208; G10L 2015/223; H04R 1/406

USPC .......................................... 381/301; 191/198
See application file for complete search history.

(56) References Cited

U.S. PATENT DOCUMENTS

| | | | |
|---|---|---|---|
| 10,128,890 B2 * | 11/2018 | Thomas | H04M 1/0202 |
| 2019/0116408 A1 | 4/2019 | Wang | |
| 2019/0320268 A1 * | 10/2019 | Blau | H04R 25/453 |

OTHER PUBLICATIONS

Shannon Liao, "This project hacks Amazon Echo and Google Home to protect your privacy", TheVerge.com, Jan. 15, 2019, 1 page.
Smarte, Mute+, https://web.archive.org/web/20190515121723/https://mysmartelife.com/products/muteplus.

\* cited by examiner

*Primary Examiner* — Ammar T Hamid
(74) *Attorney, Agent, or Firm* — Sherrill Law Offices, PLLC; Michael S Sherrill

(57) ABSTRACT

A method of selectively preventing surreptitious listening by a smart speaker by placing an audible interference device into physical proximity with the microphone(s) on the smart speaker, and whenever ensured privacy is desired toggling a feature on the audible interference device from a listening mode, wherein the device allows the microphone to receive and the smart speaker to interact with intelligible speech from the surrounding environment, and a deaf mode wherein the device inhibits reception of intelligible speech by the microphone and thereby prevents both desired and surreptitious listening by the smart speaker.

7 Claims, 6 Drawing Sheets

PRIVACY SLEEVE FOR SMART SPEAKERS

BACKGROUND

Smart speaker devices that utilize user voice-controlled commands to execute a variety of functions ("Speaker Device") have become a ubiquitous household and workplace tool. Examples of such Speaker Devices include those under the tradenames Echo and Amazon Tap by Amazon (also referred to as Alexa-enabled speakers); and Google Home and Google Home Mini by Google. Most smart speakers are of the constantly listening type, for allowing voice initiated interaction with the smart speaker.

Speaker Devices provide the ability for users to execute many functions, including, but not limited to: play music, report the weather, control smart home devices, make calls, answer questions, set timers and alarms, send messages and interact with a seemingly unlimited number of internet applications.

Despite the popularity of Speaker Devices, it is widely believed that they may compromise user privacy by providing the ability for so-called "hackers" or other unauthorized parties to covertly record conversations and other activities occurring within the effective receiving range of microphones located on the device, all without the knowledge or consent of the user.

It has also recently come to the public's attention that the smart speaker providers themselves may, even when the microphone on the Speaker Device is deactivated, be covertly listening and record conversations through the Speaker Devices.

An objective of this invention is to prevent any such unauthorized eavesdropping using Speaker Devices.

SUMMARY OF THE INVENTION

The invention is directed to a method of selectively preventing surreptitious listening by a smart speaker.

The method includes the steps of (a) placing an audible interference device into physical proximity with the microphone on the smart speaker, and (b) at periodic intervals (dictated by a desire for privacy and a desire to interact with the smart speaker) toggling a feature on the audible interference device as between (i) a deaf mode wherein the device inhibits reception of intelligible speech by the microphone and thereby prevents both desired and surreptitious listening by the smart speaker, and (ii) a listening mode wherein the device allows the microphone to receive and the smart speaker to interact with intelligible speech from the surrounding environment.

A preferred embodiment of the method comprises the step of placing a jacket over at least a portion of the smart speaker wherein the jacket is configured and arranged to inhibit reception of intelligible speech by the microphone on the smart speaker when placed over at least a portion of the smart speaker.

In a more detailed description, the method selectively and temporarily renders a smart speaker deaf to environmental speech so as to prevent surreptitious listening by a smart speaker, by (a) placing a smart speaker within a room, (b) placing an audible interference device into physical proximity with the microphone on the smart speaker, (c) activating the smart speaker for continuous listening, and then (d) periodically toggling the audible interference device as between (i) a deaf mode wherein the audible interference device inhibits reception of intelligible speech from the surrounding environment by the microphone on the smart speaker and thereby prevents both desired and surreptitious listening by the smart speaker, and (ii) a listening mode whereby the audible interference device does not inhibit reception of intelligible speech by the microphone on the smart speaker and thereby allows the smart speaker to receive, recognize and interact with intelligible speech from the surrounding environment.

The feature on the audible interference device which may be toggled between deaf mode and listening mode may range from donning and doffing the device on the smart speaker, opening and closing a window through the noise barrier formed by the device, activating and deactivating a powered noise cancelling/masking speaker on the device, etc.

DETAILED DESCRIPTION OF A PREFERRED EMBODIMENT

Definitions

Figure 1:
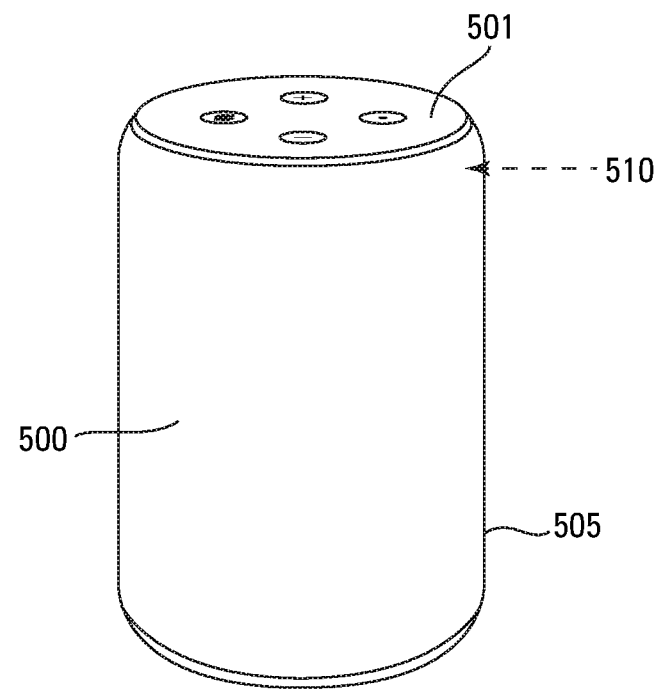
FIG. 1 is a perspective view of a prior art smart speaker.

As utilized herein including the claims, the phrase "inhibit reception of intelligible speech", means blocking intelligible speech sound waves from reception by the microphone of a smart speaker; or disruption, distortion, destructive interference, masking, etc. of intelligible speech sound waves such that the quality of any sound waves received by the microphone is unintelligible to speech recognition software.

As utilized herein including the claims, the phrase "audible interference", means to inhibit reception of intelligible speech by any means, including specifically but not exclusively blocking reception such as with a noise barrier, destructively interfering with the intelligible speech as by emitting soundwaves that cancel certain portions of the intelligible speech, and masking the intelligible speech such as by generation of white noise.

Nomenclature

| REFERENCE NO. | NAME |
| --- | --- |
| 10 | Audible Interference Device |
| 20 | Sleeve or Jacket |
| 21 | Open End of Sleeve or Jacket |
| 22 | Closed End of Sleeve or Jacket |
| 25 | Sidewall of Sleeve or Jacket |
| 28 | Layer of Fluid |
| 29 | Audible Suppression Chamber |
| 30 | Feature |
| 31 | Noise Barrier |
| 32 | Powered Noise Cancelling/Masking Speaker |
| 122 | Pivotable Closed End of Sleeve or Jacket |
| 123 | Hinge |

| REFERENCE NO. | NAME |
| --- | --- |
| 129 | Window through Device |
| 500 | Smart Speaker |
| 501 | Top of Smart Speaker |
| 505 | Exterior Surface of Smart Speaker |
| 510 | Microphone |
| 519 | Sound Channels |

Construction

The invention is a method of selectively preventing surreptitious listening by a smart speaker 500 that employs an audible interference device 10.

The device 10 can selectively inhibit reception of intelligible speech by the microphone(s) 510 and thereby prevent surreptitious listening by the smart speaker 500 by placing the device 10 into physical proximity with the microphone(s) 510 on the smart speaker 500, or more accurately the sound channels 519 in the housing (unnumbered) of the smart speaker 500 through which sound reaches the microphone(s) 510, and deploying a feature 30 on the device 10 into "deaf mode".

The feature 30 may include specifically, but not exclusively, a configuration that allows donning (deaf mode) and doffing (listening mode) of the device 10 on the smart speaker 500 over the sound channels 519 in the smart speaker 500, a window 129 through device 10 which may be opened (listening mode) and closed (deaf mode), a powered noise cancelling/masking speaker 32 on the device 10 which may be activated (deaf mode) and deactivated (listening mode), etc.

Figure 2:
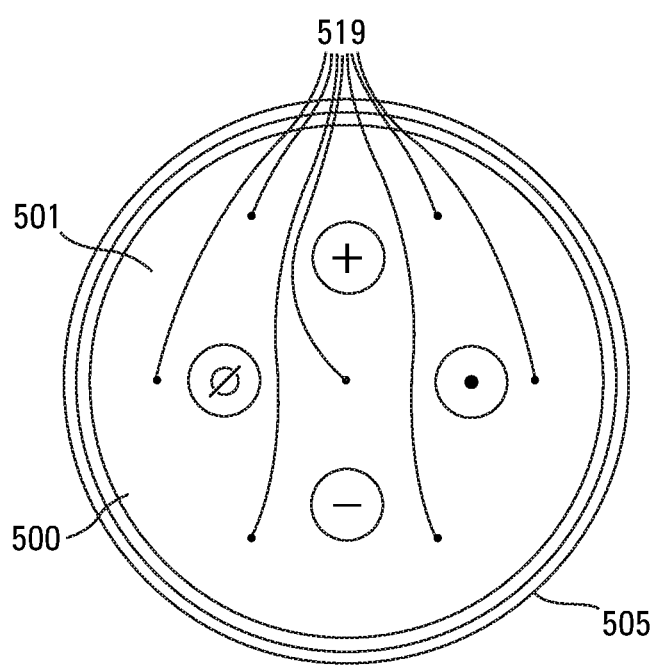
FIG. 2 is a top view of the prior art smart speaker depicted in FIG. 1.
Figure 3:
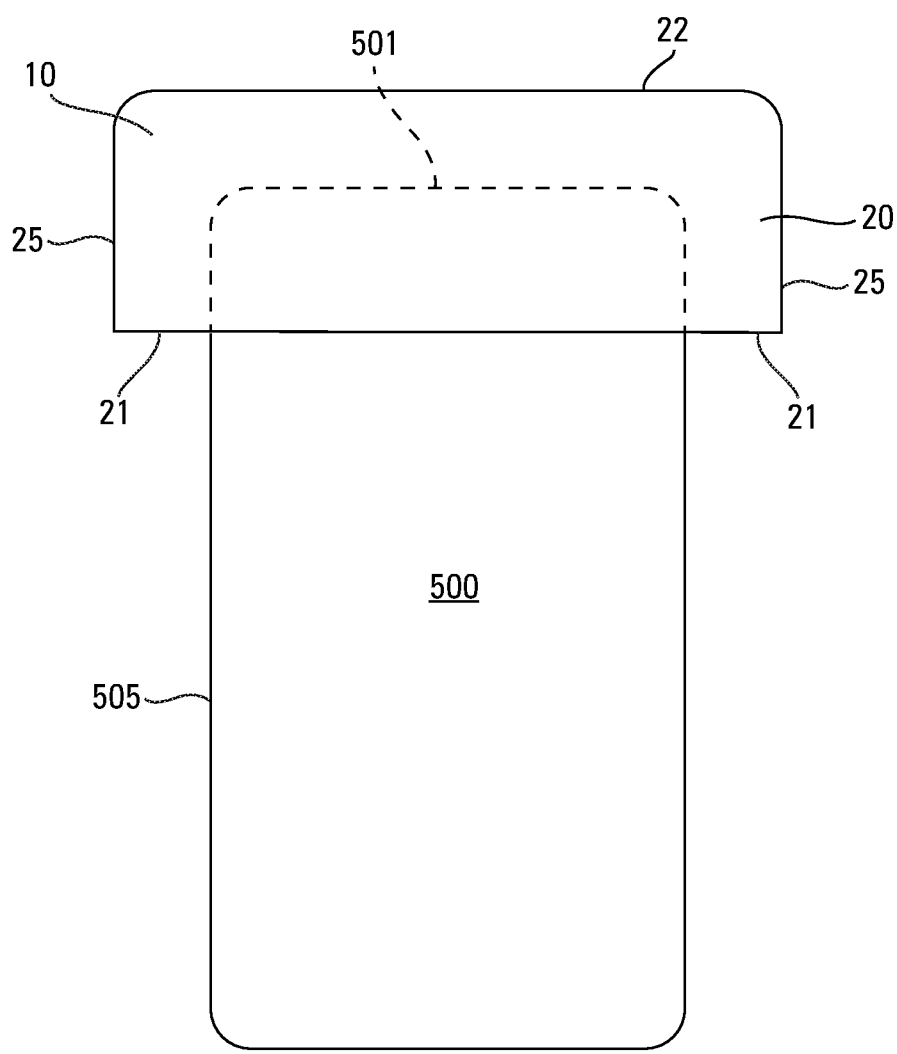
FIG. 3 is a side view of the prior art smart speaker of FIG. 1 with one embodiment of the invention placed upon the smart speaker so as to render the smart speaker deaf.
Figure 4:
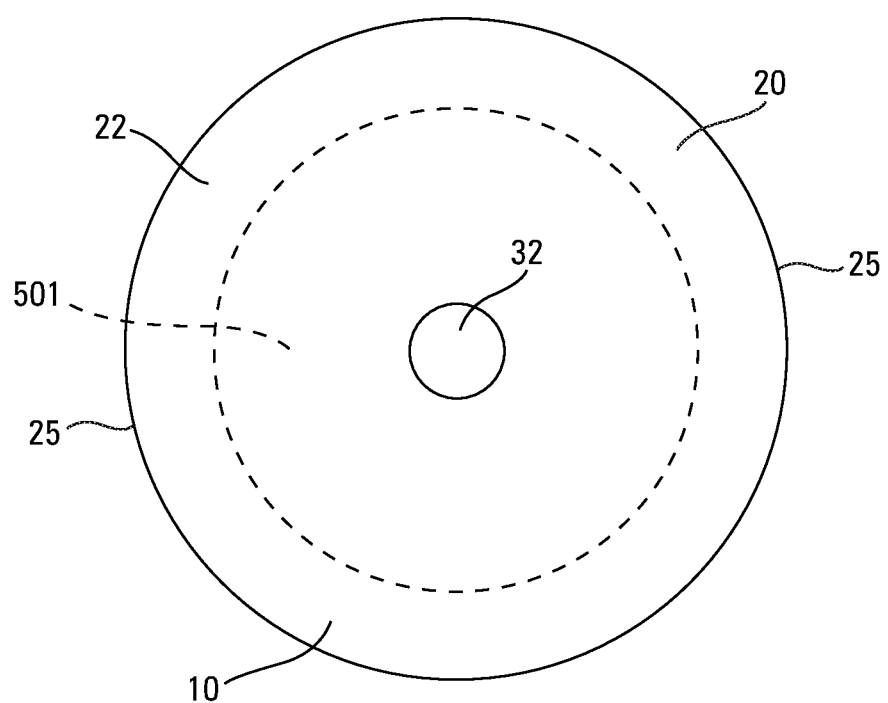
FIG. 4 is a top view of the invention depicted in FIG. 3.

FIGS. 1 and 2 depict a typical smart speaker 500 available on the market. This unit has a plurality of sound channels 519 through the top 501 of the unit through which sound reaches microphone(s) 510 located within the unit. For convenience, the balance of this description shall be based upon a smart speaker 500 having sound channels 519 through the top 501 of the unit. Persons of routine skill in the art, based upon the disclosure provided herein, would be able to readily adapt the audible interference device 10 to prevent microphone(s), located somewhere other than the top 501 of the unit 500, from receiving intelligible speech.

Referring to FIGS. 3-7, in a preferred embodiment, the audible interference device 10 is an easy-to-use, portable, soundproof sleeve or jacket 20 with an open end 21 and a closed end 22 that can be placed over a smart speaker 500 to cover all microphones 510 or other sound capture mechanisms on the smart speaker 500, thereby preventing intelligible speech from being received by the microphones 510 or other sound capture mechanisms on the smart speaker 500, or to mask and distort intelligible speech received by microphones 510 or other sound capture mechanisms on the smart speaker 500 so as to render it unintelligible. When the reception of intelligible speech by the microphone(s) 510 is prevented by active sound cancelling/masking, the sleeve or jacket 20 is preferably configured to enclose the microphones 510 on the smart speaker 500 within an audible suppression chamber 29 into which noise cancelling sound waves or noise masking white noise can be provided so as to actively interfere with reception of environmental speech by the microphone(s) 510 without sending such noise cancelling or masking soundwaves into the surrounding environment where they may distract and disturb users.

The sleeve or jacket 20 can be comprised of any material effective to block sounds. Suitable materials include, but are not limited to, sound insulation, rubber, wood, polystyrene foam (Styrofoam), aluminum and aluminum foil, materials with a dense mass, metal, acoustic fabric, acoustic board, acoustic foam, acoustic plastic, acoustic sealants, fiberglass, quilted fiberglass, rockwool insulation, vinyl, mineral wool, mass loaded vinyl, foam padding, loosely or densely packed fibers, carpet, and any type of padding.

Figure 6:
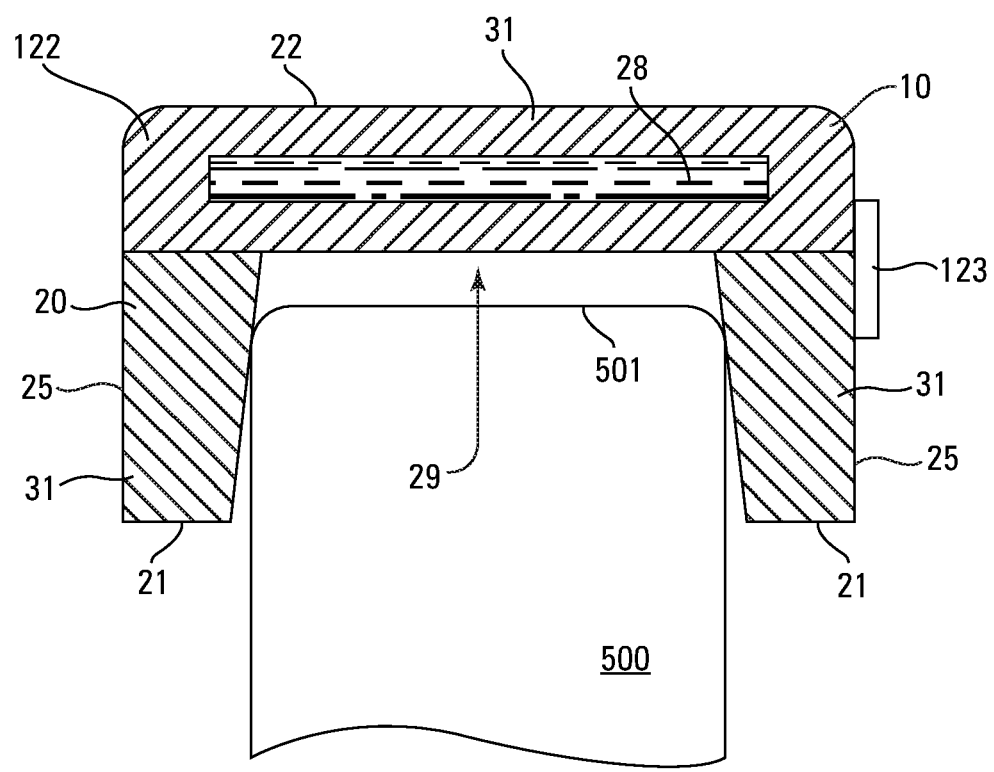
FIG. 6 is a cross-sectional side view of another embodiment of the invention placed upon the smart speaker so as to render the smart speaker deaf.

Referring to FIG. 6, to enhance the noise blocking effect, the sleeve or jacket 20 may be constructed with a fluid containing layer or pocket 28 like bubble wrap or a water bladder.

Instead of or in addition to sound blocking, a powered noise cancelling/masking speaker 32 may be provided for actively cancelling/masking sounds received by microphones 510 or other sound capture mechanisms on the smart speaker 500 so as to make the speech unintelligible. The powered noise cancelling/masking speaker 32 may generate noise-cancelling soundwaves for cancelling at least portions of any intelligible speech reaching the audible suppression chamber 29, or generating white noise for masking any intelligible speech reaching the audible suppression chamber 29.

Figure 5:
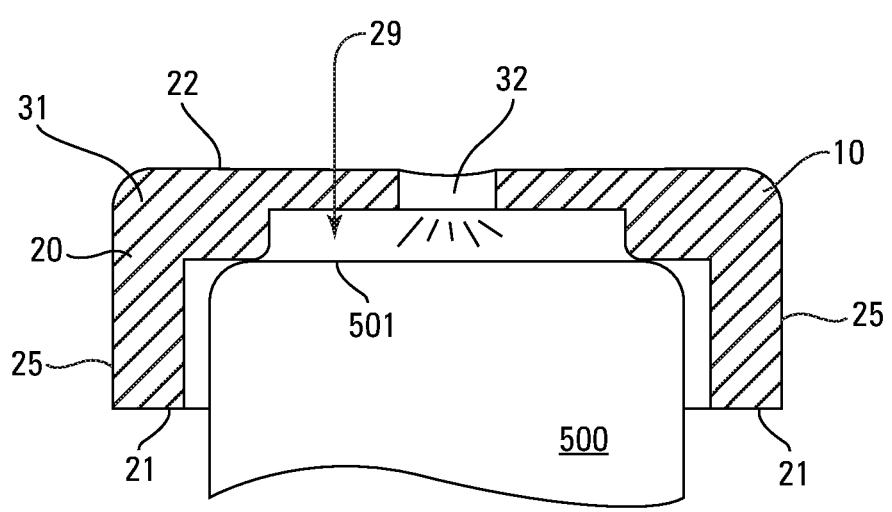
FIG. 5 is a cross-sectional side view of the invention depicted in FIGS. 3 and 4 taken along line 5-5.

The sleeve or jacket 20 can be customized to fit all shapes and sizes of smart speakers 500 for temporary or permanent attachment. One option, depicted in FIG. 5, provides an internal shoulder (unnumbered) for resting upon the peripheral margin of the top 501 of the smart speaker 500. Another option, depicted in FIG. 6, provides a conically shaped audible suppression chamber 29 for facilitating frictional form-fitted engagement of the sidewall 25 of the sleeve or jacket 20 against the upper edge (unnumbered) of the smart speaker 500. Yet another option not depicted in the figures is a sleeve or jacket 20 sized to rest upon the surface supporting the smart speaker 500 such as a table top, and enclose the entire smart speaker 500 within the audible suppression chamber 29.

Referring to FIGS. 3-6, the sleeve or jacket 20 can be toggled between deaf mode and listening mode by simply (i) placing the sleeve or jacket 20 over the top 501 of the smart speaker 500 (i.e., donning the sleeve or jacket 20) when deaf mode privacy is desired, and (ii) removing the sleeve or jacket 20 from over the top 501 of the smart speaker 500 (i.e., doffing the sleeve or jacket 20) when listing mode which allows use of the smart speaker 500 is desired.

Figure 7:
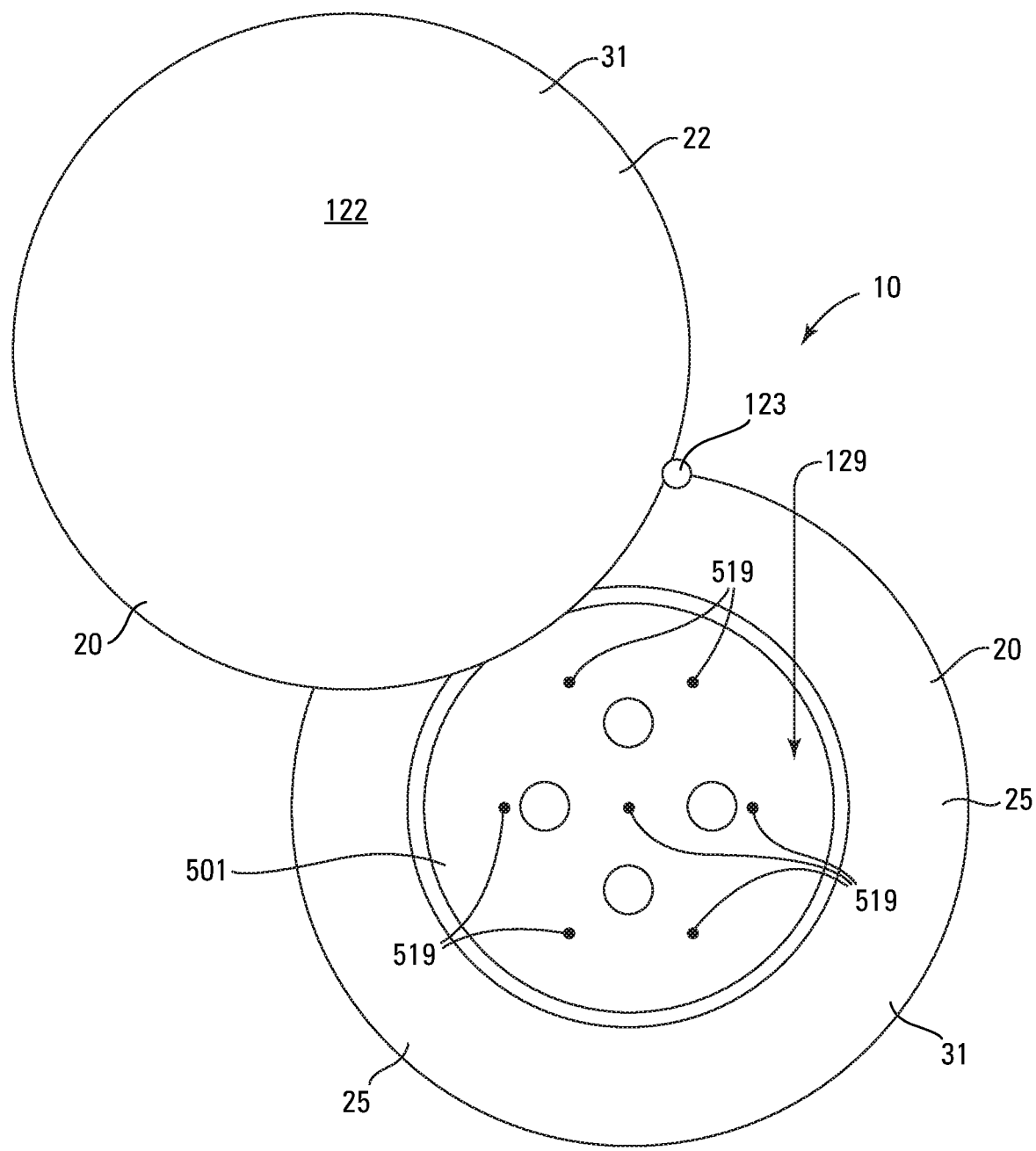
FIG. 7 is a top view of the invention depicted in FIG. 6 with the feature placed in listening mode.

Referring to FIGS. 6 and 7, as an alternative to donning and doffing the entire sleeve or jacket 20, a window 129 may be provided through the sleeve or jacket 20 with a removable cover 122 over the window 129. One such example is depicted in FIGS. 6 and 7, wherein the closed end 122 of the sleeve or jacket 20 may rotate about hinge 123 as between an open (listening mode) position depicted in FIG. 7 so that environmental speech may be intelligibly received by the microphone(s) 510, and a closed (deaf mode) position depicted in FIG. 6 so that environmental speech may not be intelligibly received by the microphone(s) 510.

When a powered noise cancelling/masking speaker 32 is employed, it preferably is equipped with an on/off button for toggling between deaf and listening modes.

Use

The audible interference device 10 is used to prevent surreptitious listening by a smart speaker 500 by placing the audible interference device 10 into physical proximity with the microphone 510 on the smart speaker 500 and deploying a feature 30 on the device 10 into "deaf mode" so as to inhibit reception of intelligible speech by the microphone 510 and thereby prevent both desired and surreptitious listening by the smart speaker 500.

Referring primarily to FIG. 6, when the audible interference device 10 inhibits reception of intelligible speech by the microphone 510 via a noise barrier 31, the device 10 covers the sound channels 519 through which the microphone(s) 510 receive sound waves. Referring primarily to FIG. 5, when the audible interference device 10 inhibits reception of intelligible speech by the microphone 510 via a powered noise cancelling/masking speaker feature 32, the device 10 should enclose the sound channels 519 within an audible suppression chamber 29 with the powered noise cancelling/masking speaker feature 32 arranged to transmit noise cancelling/masking sound waves into the audible suppression chamber 29.

The smart speaker 500 may be returned to a listening mode, wherein the microphone(s) 510 can receive intelligible speech from the surrounding environment and interact with a user, by toggling the feature 30 on the device 10 into listening mode (e.g., doffing the device 10, opening the window 129 through device 10, deactivating the powered noise cancelling/masking speaker 32, etc.).

I claim:

1. A method of selectively preventing surreptitious listening by a smart speaker having a microphone, comprising the step of placing a jacket over at least a portion of the smart speaker wherein the jacket is configured and arranged to inhibit reception of intelligible speech by the microphone when placed over at least a portion of the smart speaker by providing a noise barrier comprising a wall having an interior layer of water between the microphone and the surrounding environment.

2. The method of claim 1 wherein the smart speaker has an array of microphones and the jacket inhibits the entire array of microphones from receiving intelligible speech.

3. The method of claim 1 wherein the jacket is an open-ended container defining an audible suppression chamber configured and arranged for selective placement over the smart speaker so as to envelop the smart speaker within the audible suppression chamber.

4. The method of claim 3 wherein the audible suppression chamber form fits to at least a portion of the smart speaker.

5. The method of claim 3 wherein the jacket is comprised of sound insulating foam.

6. A method of selectively preventing surreptitious listening by a smart speaker having a microphone, comprising the step of placing a jacket over at least a portion of the smart speaker, wherein the jacket includes a noise-cancellation speaker which emits destructive interference sound waves, the jacket is an open-ended container defining an audible suppression chamber configured and arranged for selective placement over the smart speaker so as to envelop the smart speaker within the audible suppression chamber, and the noise-cancellation speaker is configured and arranged to transmit the destructive interference sound waves into the audible suppression chamber.

7. A method of selectively preventing surreptitious listening by a smart speaker having a microphone, comprising the step of placing a jacket over at least a portion of the smart speaker, wherein the jacket includes a white noise generating speaker which emits white noise, the jacket is an open-ended container defining an audible suppression chamber configured and arranged for selective placement over the smart speaker so as to envelop the smart speaker within the audible suppression chamber, and the white noise generating speaker is configured and arranged to transmit the white noise into the audible suppression chamber.

* * * * *